Jan. 17, 1961 T. H. BERRY 2,968,354
LIFTER AND BREAKER PLATE ASSEMBLY FOR BRUSH CUTTING MACHINES
Filed Sept. 29, 1958 2 Sheets-Sheet 1
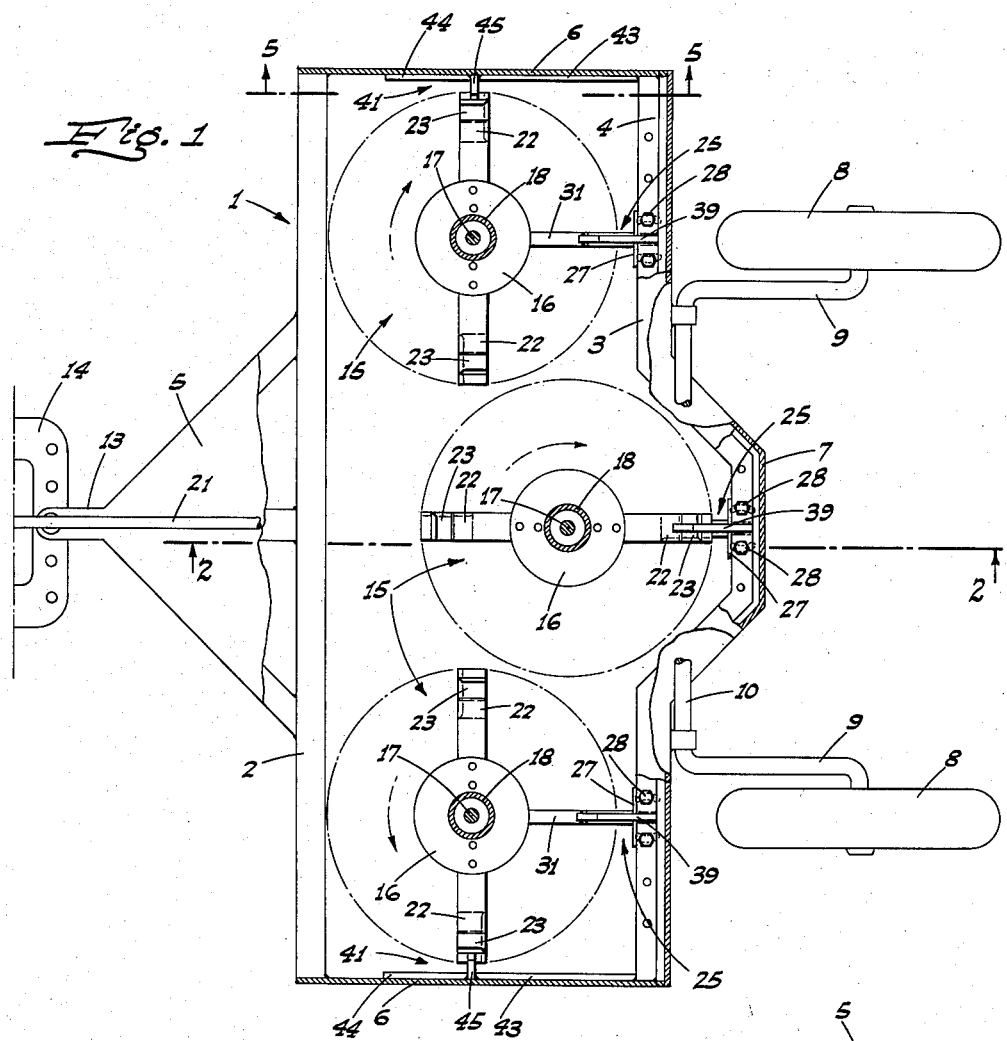
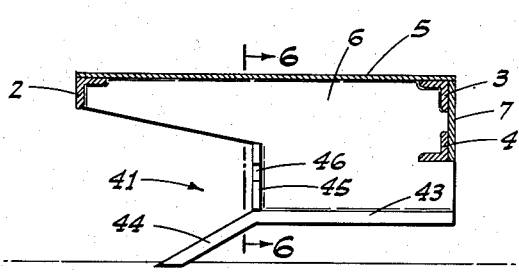
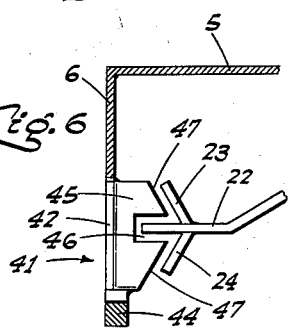
INVENTOR.
Thomas H. Berry
BY
Webster & Webster
ATTYS.

Jan. 17, 1961  T. H. BERRY  2,968,354
LIFTER AND BREAKER PLATE ASSEMBLY FOR BRUSH CUTTING MACHINES
Filed Sept. 29, 1958  2 Sheets-Sheet 2
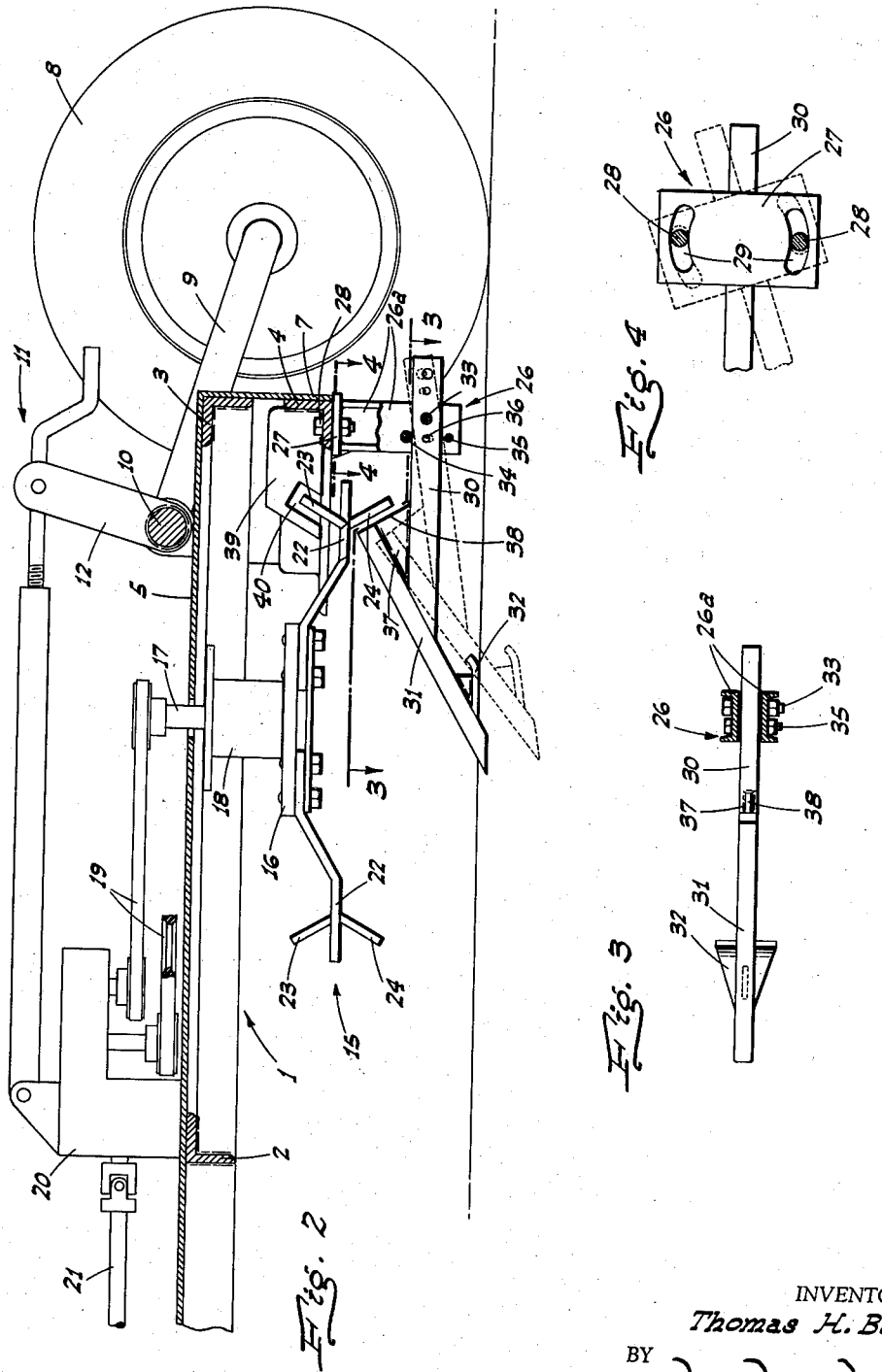
INVENTOR.
Thomas H. Berry
BY Webster & Webster
ATTYS.

United States Patent Office 2,968,354
Patented Jan. 17, 1961

2,968,354

LIFTER AND BREAKER PLATE ASSEMBLY FOR BRUSH CUTTING MACHINES

Thomas H. Berry, 747 S. 99 Highway, Modesto, Calif.

Filed Sept. 29, 1958, Ser. No. 764,091

9 Claims. (Cl. 172—28)

This invention relates in general to improvements in a brush cutting machine of the type which includes one or more driven vertical axis rotary cutting blade units.

In particular, the invention is directed to, and it is a major object to provide, a novel brush lifter and breaker plate assembly for a machine of the type described; the lifter being operative to elevate brush from the ground into the path of rotation of a corresponding rotary cutting blade unit, and the related breaker plate functioning to enhance the cutting or chopping action of said unit while maintaining the latter clear of debris and possible entanglement.

Another important object of the invention is to provide a brush lifter and breaker plate assembly, as above, which is especially designed—but not limited—for use with a rotary cutting blade unit having circumferentially spaced, generally radially projecting blades, each of which includes—on the outer end portion—a pair of supplementary stub blades; one stub blade extending upwardly and the other downwardly.

An additional object of the invention is to provide a brush lifter which includes a forwardly and downwardly inclined lifter bar supported from the frame of the machine, and in predetermined relation to the corresponding rotary cutting blade unit, by a novel adjustable mount.

A further object of the invention is to provide a breaker plate rigidly mounted on the frame of the machine and of a novel form for cooperation with a rotary cutting blade unit having stub blades on the outer end portion thereof, as aforesaid.

It is also an object of the invention to provide a lifter and breaker plate assembly which is designed for ease and economy of manufacture, ready installation on a brush cutting machine, and long service under heavy duty working conditions.

A still further object of the invention is to provide a practical, reliable, and durable lifter and breaker plate assembly, and one which is exceedingly effective for the purpose for which it is designed.

These objects are accomplished by means of such structure and relative arrangement of parts as will fully appear by a perusal of the following specification and claims:

In the drawings:

Fig. 1 is a top plan view of a brush cutting machine embodying the present invention; the top plate of the frame being mainly broken away and certain of the adjacent parts being in section.

Fig. 2 is an enlarged longitudinal sectional elevation, taken on line 2—2 of Fig. 1, and showing one of the rotary cutting blade units and the corresponding lifter and breaker plate assembly.

Fig. 3 is a fragmentary plan view, partly in section, taken on line 3—3 of Fig. 2, and showing one of the lifters.

Fig. 4 is a fragmentary plan view, partly in section, taken on line 4—4 of Fig. 2, and showing a lifter mount from above.

Fig. 5 is a longitudinal sectional elevation taken on line 5—5 of Fig. 1, and showing one side-mounted lifter and breaker plate assembly.

Fig. 6 is a transverse sectional elevation taken on line 6—6 of Fig. 5.

Referring now more particularly to the drawings and to the characters of reference marked thereon, the present invention is embodied in a brush cutting machine which includes a transversely elongated, rectangular frame, indicated generally at 1, and which frame is open at the bottom and front. The frame 1 includes a front cross beam 2, an upper rear cross beam 3, a lower rear cross beam 4, a top plate 5, side plates 6, and a rear plate 7.

The frame 1 is supported in an above-ground position—and for travel therealong—by transversely spaced rear wheels 8 carried on cranks 9 on the ends of a cross shaft 10 journaled on said frame 1 at the back thereof. The cross shaft 10 is turnably adjustable, to raise or lower the rear wheels 8, by means of a crank-actuated adjustment unit indicated generally at 11, and which adjustment unit is connected to said cross shaft 10 by a radial lever arm 12.

A hitch structure, including a tongue 13, projects forwardly from the front of the frame 1; the tongue 13 being adapted for connection to a tractor drawbar 14, whereby the brush cutting machine is advanced along the ground.

Within the confines of the frame 1, the brush cutting machine includes a plurality—here three—of driven vertical axis rotary cutting blade units disposed in transversely spaced relation, each of which is indicated generally at 15. In the present machine, the intermediate rotary cutting blade unit 15 is offset to the rear, and the frame 1 has a corresponding rearward offset therein, as shown, to provide adequate clearance.

Each rotary cutting blade unit comprises a vertical axis rotary disc 16 provided with an upstanding spindle 17 journaled in a stationary hub or bearing 18 fixed—in connection with the frame—below the top plate 5; the spindle 17 projecting through and terminating above such top plate.

Each spindle 17 is driven by an endless belt 19 from a gear box 20 mounted on said top plate 5, and which gear box is actuated by a drive shaft 21 which leads rearwardly from the power take-off shaft (not shown) of the tractor.

A pair of opposed primary cutting blades 22 are secured to the rotary disc 16 and radiate therefrom.

The opposed primary cutting blades 22 are offset downwardly intermediate their ends and the outer end portions are horizontal, as shown. The outer end portion of each of the blades 22 is fitted with an upstanding stub blade 23 and a depending stub blade 24; such stub blades diverging in a radially outward direction. The leading edges of the outer end portions of the primary cutting blades 22—as well as the stub blades 23 and 24—are sharpened, as shown in Fig. 1; the rotary cutting blade units 15 rotating in suitably cooperating directions.

With the exception of the stub blades 23 and 24, the above described brush cutting machine is substantially conventional, and to it I apply the present invention, and which includes for each rotary cutting blade unit 15 a rear mounted lifter and breaker plate assembly indicated generally at 25. As such rear mounted lifter and breaker plate assemblies are of the same construction, a description of one will suffice for all.

Each such lifter and breaker plate assembly 25 comprises a bracket, indicated generally at 26, which depends from the lower rear cross beam 4 in substantially longitudinal alinement with the axis of the corresponding rotary cutting blade unit 15; such bracket including transversely spaced bracket legs 26a fixed, at their upper ends, to a horizontal attachment plate 27 secured to said lower rear cross beam 4 by transversely spaced bolts 28 which engage through arcuate slots 29 in said attachment plate 27. The slots 29 permit of rotary adjustment of the attachment plate 27 as may be necessary to properly position the lifter structure carried by said bracket 26, and which comprises the following:

A longitudinally extending supporting arm 30 engages interemdiate its ends between the bracket legs 26a, and thence extends forwardly to a front end termination below the corresponding rotary cutting blade unit 15; such supporting arm being fixed—at its front end—to a rearwardly and upwardly inclined brush lifting bar 31 intermediate the ends of the latter. Such brush lifting bar 31 is dimensioned lengthwise so that its lower end normally runs a slight distance in the ground, while the upper end terminates adjacent but short of the paths of rotation of the outer end portions of the blades 22 and the depending stub blades 24.

Penetration of the brush lifting bar 31 into the ground below a predetermined depth is prevented by a skid 32 mounted on the lower portion of said bar 31 at the backside thereof.

However, the brush lifting bar 31 is capable of limited vertical floating motion as the skid 32 traverses undulating ground, such floating motion of the brush lifting bar 31 being made possible by the manner in which the supporting arm 30 is connected to the bracket 26, and which is as follows:

A transverse pivot bolt 33 extends through the supporting arm 30 and bracket legs 26a, while upper and lower transverse stop bolts 34 and 35, respectively, span between such bracket legs 26a above and below the supporting arm 30; such stop bolts being vertically spaced a distance somewhat greater than the height of said supporting arm 30, so as to permit the desired vertical floating motion of said arm and the connected brush lifting bar 31.

Under certain working conditions, it may be desired to prevent such floating motion of arm 30 and bar 31, and to this end the stop bolt 35 is withdrawn from its normal position and inserted through matching bolt holes 36 in said arm 30 and bracket legs 26a ahead of the pivot bolt 33.

Additionally, the supporting arm 30 may be longitudinally adjusted on the bracket 26, and to this end there are provided additional bolt holes, as shown.

The lower stop bolt is of smaller diameter than the pivot bolt 33 whereby to serve as a shear pin should theb rush lifting bar 31 strike a relatively immovable object. Upon shearing of the stop bolt 35, the arm 30 and bar 31 can swing down to some extent but which is usually sufficient to prevent damage before the machine can be stopped.

A gusset 37 is fixed between the rear upper portion of the lifting bar 31 and the upper forward portion of the supporting arm 30; such gusset 37 having a downwardly and rearwardly inclined edge 38 past which each depending stub blade 24 travels in adjacent but spaced parallel relation with rotation of the cutting blade unit 15.

An upstanding forwardly projecting breaker plate 39 is fixed to the lower rear cross beam 4 in vertical alinement with the bracket 26; such breaker plate 39 overhanging the path of rotation of the outer end portions of the primary cutting blades 22. The breaker plate 39 is formed with a downwardly opening notch 40 through which the upstanding stub blades 23 travel upon rotation of the cutting blade unit 15.

As the machine advances along the ground—with each rotary cutting blade unit 15 being driven at relatively high speed—the bar 31 of each assembly 25 engages and elevates the brush lying on the ground; the brush—as elevated—being delivered into the path of rotation of the related cutting blade unit 15, whereupon such unit effectively cuts, chops, and mulches the brush. Such cutting action is enhanced by the upstanding stub blades 23 working in cooperation with the corresponding breaker plate 39, and the depending stub blades 24 working in cooperation with the upper end portion of bar 31 and the adjacent gusset 37. Also, the breaker plate 39 tends to prevent brush or debris from carrying about on the rotary cutting blade unit 15; i.e. it serves—in effect—as a cleaning instrumentality.

In addition to the rear-mounted lifter and breaker plate assemblies 25, the invention also contemplates the inclusion, in the machine, of side-mounted lifter and breaker plate assemblies, indicated generally at 41.

Each side-mounted lifter and breaker plate assembly 41 is secured in connection with the adjacent one of the side plates 6 and comprises the following:

Each side plate 6 is cut away at its forward lower corner to define a vertical edge 42, and a longitudinal arm 43 is secured to the lower edge of the side plate from the rear thereof to a point adjacent the lower end of said vertical edge 42. Thence, the longitudinal arm 43 extends at a forward and downward incline, as a lifter bar 44, to the ground.

A vertical, laterally inwardly projecting breaker plate 45 is fixed to the side 6 at said vertical edge 42. The breaker plate 45, which is disposed in substantially the horizontal plane of rotation of the adjacent cutting blade unit 15, is formed with a laterally inwardly opening notch 46 through which the outer end portion of the primary cutting blades 22 pass with rotation of said unit. Additionally, the breaker plate 45 includes laterally innermost edges 47 disposed above and below the notch 46 and cut on an angle so that such edges parallel the corresponding stub blades 23 and 24 as they pass the breaker plate 45.

The side-mounted lifter and breaker plate assemblies 41 function in substantially the same manner as the rear-mounted assemblies 25; i.e. the bars 44 lift the brush from the ground into the path of rotation of the adjacent rotary cutting blade unit 15, whereupon the brush is effectively cut by such unit. The breaker plate 45 of each assembly 41 further enhances the cutting action, and—similar to the breaker plates 39—aids in cleaning of the peripheral and working portion of the related rotary cutting blade unit 15.

The side-mounted lifter and breaker plate assemblies 41, in cooperation with the assemblies 25, provide for effective brush lifting—into the rotary cutting blade units 15—for the full width of the machine.

The present invention, embodying the lifter and breaker plate assemblies 25 and 41, functions to cause the machine to work more positively and with greater effectiveness than otherwise, and, additionally, the rotary cutting blade units 15 need not be run as close to the ground as ordinarily, and which is of advantage in that possible blade damage is minimized.

From the foregoing description, it will be readily seen that there has been produced such a device as substantially fulfills the objects of the invention, as set forth herein.

While this specification sets forth in detail the present and preferred construction, of the device, still in practice such deviations from such detail may be resorted to as do not form a departure from the spirit of the invention, as defined by the appended claims.

Having thus described the invention, the following is claimed as new and useful and upon which Letters Patent is desired:

1. In a brush cutting machine which includes an above-ground frame, the frame having a rear cross member, and a driven vertical axis rotary cutting blade unit frame-supported above ground ahead of the rear cross member; a brush lifting device comprising a longitudinally extending brush lifting bar, said bar being positioned at an upward and rearward incline from the ground to an upper end termination adjacent but clear of the path of rotation of the rotary cutting blade unit, a longitudinal supporting arm fixed to and projecting rearwardly from the lifting bar intermediate the ends of the latter, a bracket comprising transversely spaced legs secured to and depending from the rear cross member, the supporting arm extending between such legs, a transverse connecting pivot projecting through said legs and arm, and stop elements spanning between the bracket legs arranged relative to the pivot and arm to engage the arm on opposite sides of the pivot and allowing of limited vertical floating motion of the arm about the pivot.

2. A structure, as in claim 1, in which one of said elements is detachable from the bracket legs, said legs and the arm having matching holes offset from the pivot to receive said element whereby to then maintain the arm rigid with the bracket in an operating position.

3. In a brush cutting machine which includes an above-ground frame, the frame having a rear cross member, and a driven vertical axis rotary cutting blade unit frame-supported above ground ahead of the rear cross member; a brush lifting device comprising a longitudinally extending brush lifting bar, said bar being positioned at an upward and rearward incline from the ground to an upper end termination adjacent but clear of the path of rotation of the rotary cutting blade unit, a longitudinal supporting arm fixed to and projecting rearwardly from the lifting bar intermediate the ends of the latter, a bracket secured to and depending from the rear cross member, and means connecting the supporting arm to the bracket; the rotary cutting blade unit including a radially extending primary blade, and a stub blade fixed on and depending from the outer portion of said primary blade; the lifting bar being disposed under said cutting blade unit with the upper end of said bar disposed close to but clear of the path of rotation of the stub blade.

4. A device, as in claim 3, including a gusset fixed between the upper portion of the lifting bar and the front portion of the supporting arm, said gusset having a downwardly and rear-inclined rear edge; the stub blade being inclined downwardly and outwardly and running close to said edge substantially parallel thereto.

5. In a brush cutting machine which includes an above-ground frame, the frame having a rear cross member, and a driven vertical axis rotary cutting blade unit frame-supported above ground ahead of the rear cross member; a brush lifter and breaker plate assembly comprising a longitudinally extending brush lifting bar disposed beneath the rotary cutting blade unit, said bar being positioned at an upward and rearward incline from the ground to an upper end termination adjacent but below the path of rotation of the radially outermost portion of said cutting blade unit, a mount securing the lifting bar in such position to the rear cross member, and a breaker plate fixed on the rear cross member and projecting forwardly in overhanging relation to said path of rotation; the rotary cutting blade unit including a radially extending primary blade and a stub blade fixed on and upstanding from the outermost portion of said primary blade, the breaker plate having a downwardly opening notch therein, and the stub blade recurringly passing through such notch upon rotation of the rotary cutting blade unit, and another stub blade fixed on and depending from the outermost portion of said primary blade; the upper end of the lifting bar being disposed in front of said other stub blade when said first named stub blade passes through said notch in the breaker plate.

6. In a brush cutting machine which includes an above-ground frame, the frame having a depending side with a forwardly facing edge, and a driven vertical axis rotary cutting blade unit frame-supported above ground laterally inwardly of said depending side, such unit embodying a radially projecting blade whose outer portion runs in a path of rotation closes to but clear of said depending side; a brush lifter and breaker plate assembly comprising a brush lifting bar extending from such edge at a forward and downward incline to the ground, means mounting the lifting bar on said depending side, and a vertical, laterally inwardly projecting breaker plate secured to said depending side adjacent said edge and above the lifting bar, the breaker plate having a laterally inwardly opening notch therein, and said outer portion of the blade securingly passing through the notch upon rotation of the rotary cutting blade unit; said blade including upwardly and downwardly projecting stub blades on said outer portion thereof, such stub blades diverging in a radially outward direction, and the breaker plate having edges corresponding and parallel to said stub blades as the latter pass said breaker plate edges.

7. In a brush cutting machine which includes an above-ground frame, the frame having a rear member and a side member, and a driven vertical axis rotary cutting blade unit frame-supported above ground ahead of the rear member and laterally inwardly of the side member; a brush lifter and breaker plate assembly comprising brush lifting bars secured to and projecting longitudinally from said members at a forward and downward incline to the ground, one lifting bar extending beneath the rotary cutting blade unit and the other lifting bar being disposed laterally thereof, one breaker plate fixed on the rear member and projecting forwardly, and another breaker plate fixed on the side member and projecting laterally inwardly; the blade unit including a horizontal primary blade and a stub blade extending in a vertical plane radially of the cutter unit at an angle to the primary blade and adjacent the outer end of the latter; the breaker plates each having a notch therein, the notch of one plate being positioned to receive the outer end portion of the primary blade therethrough and the notch of the other plate being positioned to receive the outer end portion of the stub blade therethrough.

8. In a brush cutting machine which includes an above-ground frame, the frame having a rear cross member, and a driven vertical axis rotary cutting blade unit frame-supported above ground ahead of the rear cross member; a brush lifting device comprising a longitudinally extending brush lifting bar, said bar being positioned at an upward and rearward incline from the ground to an upper end termination adjacent but clear of the path of rotation of the rotary cutting blade unit, a bracket secured to and depending from said rear cross member, a longitudinal supporting arm fixed to and projecting rearwardly from the lifting bar, and means connecting the supporting arm to the bracket for longitudinal adjustment relative thereto while maintaining the bar in an operative position.

9. In brush cutting machine which includes an above-ground frame, the frame having a rear cross member, and a driven vertical axis rotary cutting blade unit frame-supported above ground ahead of the rear cross member; a brush lifting device comprising a longitudinally extending brush lifting bar, said bar being positioned at an upward and rearward incline from the ground to an upper end termination adjacent but clear of the path of rotation of the rotary cutting blade unit, a bracket depending from said rear cross member, a longitudinal supporting arm fixed to and projecting rearwardly from the lifting bar, means connecting the supporting arm to the bracket, and means mounting the bracket on said cross member for adjustment relative thereto about a vertical axis.

References Cited in the file of this patent

UNITED STATES PATENTS

| | | |
|---|---|---|
| 1,061,354 | Brigden | May 13, 1913 |
| 1,292,697 | Brigden | Jan. 28, 1919 |
| 1,813,651 | Young | July 7, 1931 |
| 1,883,694 | Goble | Oct. 18, 1932 |
| 2,453,197 | Clay | Nov. 9, 1948 |
| 2,612,017 | Jarmin | Sept. 30, 1952 |
| 2,701,942 | Caldwell et al. | Feb. 15, 1955 |
| 2,781,709 | Caldwell et al. | Feb. 19, 1957 |
| 2,816,410 | Nobles | Dec. 17, 1957 |